(12) United States Patent
Bellerose et al.

(10) Patent No.: US 7,407,361 B2
(45) Date of Patent: Aug. 5, 2008

(54) TRAILER FOR SMALL VEHICLES

(75) Inventors: René Bellerose, Rock Forest (CA); Alexandre Bellerose, Rock Forest (CA)

(73) Assignee: Rebell Innovation Inc., Danville (CA)

( * ) Notice: Subject to any disclaimer, the term of this patent is extended or adjusted under 35 U.S.C. 154(b) by 38 days.

(21) Appl. No.: 11/350,116

(22) Filed: Feb. 9, 2006

(65) Prior Publication Data

US 2007/0183876 A1    Aug. 9, 2007

(51) Int. Cl.
    *B60P 1/04* (2006.01)
(52) U.S. Cl. .................................... 414/482; 280/414.1
(58) Field of Classification Search ................. 414/482; 280/414.1
    See application file for complete search history.

(56) References Cited

U.S. PATENT DOCUMENTS

| | | | | |
|---|---|---|---|---|
| 2,834,492 | A * | 5/1958 | Roy, Sr. et al. | 414/482 |
| 3,568,624 | A * | 3/1971 | Bjorklund | 440/12.69 |
| 3,620,397 | A * | 11/1971 | Gagnon | 414/482 |
| 4,221,420 | A * | 9/1980 | Vencill et al. | 410/24 |
| 4,685,855 | A * | 8/1987 | Celli | 414/482 |
| 5,228,713 | A * | 7/1993 | Kovach | 280/414.1 |
| 5,234,307 | A * | 8/1993 | Scott | 414/467 |
| 5,417,447 | A | 5/1995 | Godbersen | |
| 5,429,383 | A | 7/1995 | Reed | |
| 5,431,423 | A | 7/1995 | Moreland, Sr. | |
| 5,518,261 | A | 5/1996 | Godbersen | |
| D390,814 | S | 2/1998 | Weinacht | |
| 5,961,139 | A | 10/1999 | Nichols, II | |
| 6,361,060 | B1 | 3/2002 | Kamminga | |
| 6,447,237 | B1 * | 9/2002 | Haynes | 414/483 |
| 6,616,166 | B2 * | 9/2003 | Marchese | 280/414.1 |
| 6,698,994 | B2 * | 3/2004 | Barrett | 414/462 |
| 2002/0110442 | A1 * | 8/2002 | Hurlburt | 414/482 |
| 2003/0137124 | A1 | 7/2003 | Marchese | |

* cited by examiner

*Primary Examiner*—Saul J. Rodriguez
*Assistant Examiner*—Joshua I Rudawitz
(74) *Attorney, Agent, or Firm*—Ogilvy Renault LLP (57) ABSTRACT

A trailer of the type being connectable to a towing vehicle so as to tow a small vehicle comprises a structure supported by wheels. The structure has a connector portion, adapted to be connected to the towing vehicle. A pivoting mechanism connects a support frame to the connector portion in such a way that the support frame is pivotable about a first axis between a towing position in which the support frame supports the small vehicle for towing and a loading/unloading position in which the support frame is inclined with a loading/unloading end being adjacent to the ground. Springs are positioned between the support frame and the connector portion to bias the support frame to the loading/unloading position. A locking mechanism locks the support frame to the connector portion in the towing position of the support frame.

9 Claims, 12 Drawing Sheets

FIG. 8 understand# TRAILER FOR SMALL VEHICLES

BACKGROUND OF THE INVENTION

1. Field of the Invention

The present invention relates to trailers of the type being towed by cars, trucks and the like and, more particularly, to a trailer used to tow small vehicles such as watercrafts (e.g., personal watercrafts), motorcycles, all-terrain vehicles, and the like.

2. Background Art

Trailers are well known and used to tow small vehicles, such as watercraft (e.g., personal watercraft) motorcycles, all-terrain vehicles, and the like. There are however issues associated with the use of such trailers.

Some of the trailers are provided with ramps that are deployed such that a vehicle can be driven onto a support platform of the trailer. In a more compact design, the support platform has a rocking mechanism which reaches a tilted position to receive a small vehicle, and is pivoted to a horizontal position in which the small vehicle is towed.

As a small vehicle is driven onto the support platform, the rocking mechanism will often abruptly pivot to the horizontal position. In addition to potential damage to the trailer and/or small vehicle, the suspension of the towing vehicle may also be affected. Therefore, the small vehicle must slowly and carefully be positioned onto the support platform.

Trailers are often used with watercraft. The trailers tow the watercraft down ramps to release the watercraft on the water. The ramps are often in a bad shape. For instance, some ramps finish by a sharp drop, therefore making the use of trailers on such ramps tricky. In other instances, it may be required to release the watercraft on water in areas in which there are no ramps. In such a case, the watercraft are often manually carried to the water.

SUMMARY OF INVENTION

It is therefore an aim of the present invention to provide a trailer for towing small vehicles that addresses issues pertaining to the prior art.

Therefore, in accordance with the present invention, there is provided a trailer of the type being connectable to a towing vehicle so as to tow a small vehicle, comprising: wheels; a structure supported by the wheels, the structure having: a connector portion, adapted to be connected to the towing vehicle; a support frame having a support configuration with a loading/unloading end to support the small vehicle; a pivoting mechanism connecting the support frame to the connector portion in such a way that the support frame is pivotable about a first axis between a towing position in which the support frame supports the small vehicle for towing and a loading/unloading position in which the support frame is inclined with the loading/unloading end being adjacent to the ground; at least one spring positioned between the support frame and the connector portion to bias the support frame to the loading/unloading position; and a locking mechanism to lock the support frame to the connector portion in the towing position of the support frame.

Further in accordance with the present invention, there is provided a trailer of the type being connectable to a towing vehicle so as to tow a watercraft, comprising wheels; a structure supported by the wheels, the structure having: a connector portion, adapted to be connected to the towing vehicle; a support frame connected to the connector portion and having a support configuration with a loading/unloading end to support the watercraft, the support configuration having at least one longitudinal pipe sealable to form a floating member floatably supporting the trailer in water, the longitudinal pipe having an opening at a bottom end to allow air to enter the longitudinal pipe, and an opening at an upper end; and a valve blocking the opening at the upper end of the longitudinal pipe to retain/release air from the longitudinal pipe.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
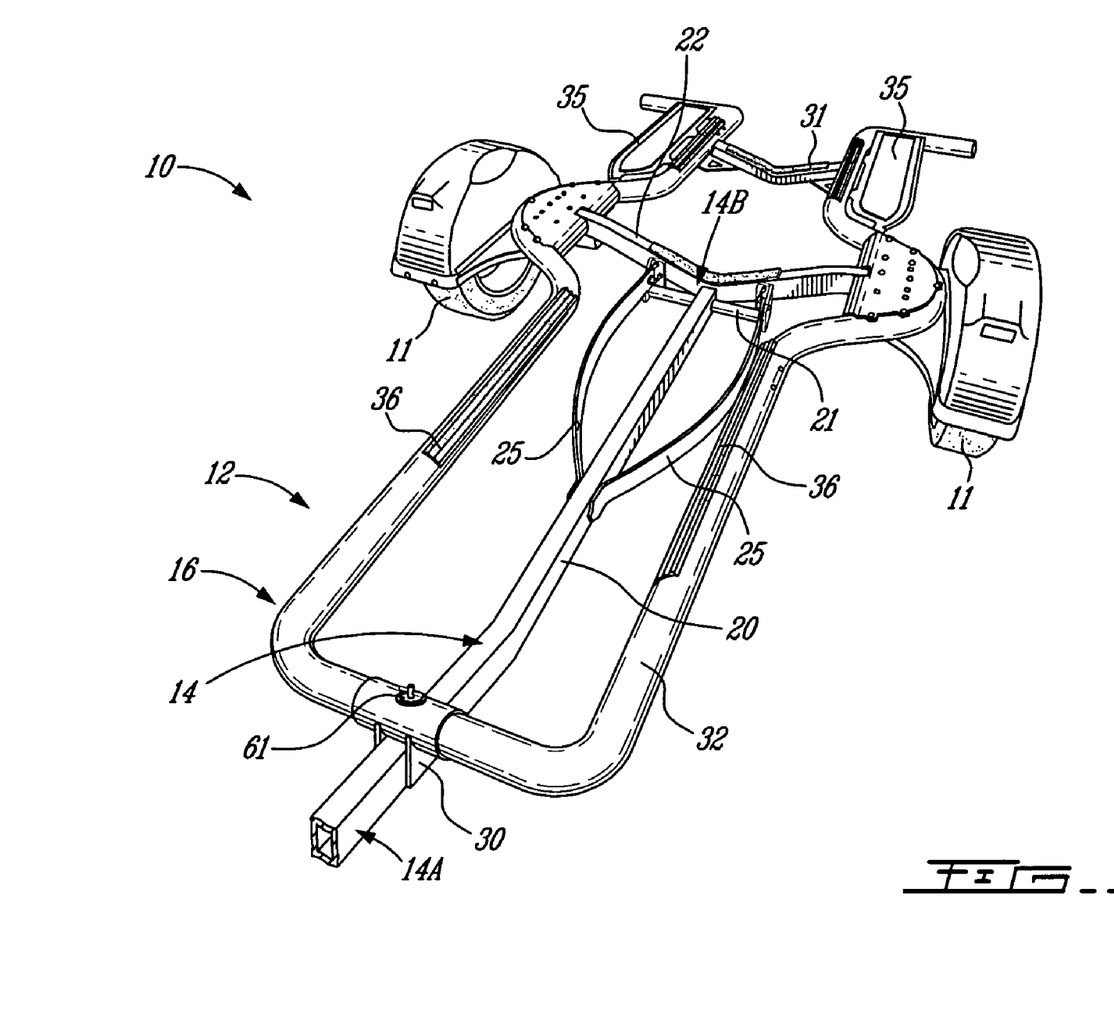
FIG. 1 is a front perspective view of a trailer constructed in accordance with an embodiment of the present invention, in a watercraft-carrying configuration.

Referring now to the drawings and more particularly to FIG. 1, a trailer for small vehicles in accordance with a preferred embodiment is generally shown at 10. The trailer 10 is of the type being connected to a towing vehicle, such as a car or truck, so as to support and two a small vehicle, such as boat, a personal watercraft, a motorcycle, an all-terrain vehicle (i.e., ATV, such as a quad).

In the illustrated embodiment, the trailer 10 has a pair of wheels 11 and a structure 12. It is contemplated to provide alternative ground interfaces, such as skis, endless tracks or the like. The structure 12 has a connector portion 14 and a support frame 16.

The connector portion 14 is the interface of the trailer 10 with the towing vehicle. The connector portion 14 is therefore connected at a first end 14A to the vehicle. The connector portion 14 is connected at a second end 14B to the support frame 16, in a pivoting relation.

The support frame 16 is supported by the wheels 11 and by the connector portion 14. The support frame 16 is constituted of support members configured as a function of the type of vehicles to be towed. The configuration of support members will be described in further detail hereinafter. The support frame has a loading/unloading end, at a rear end of the trailer 10.

Figure 2:
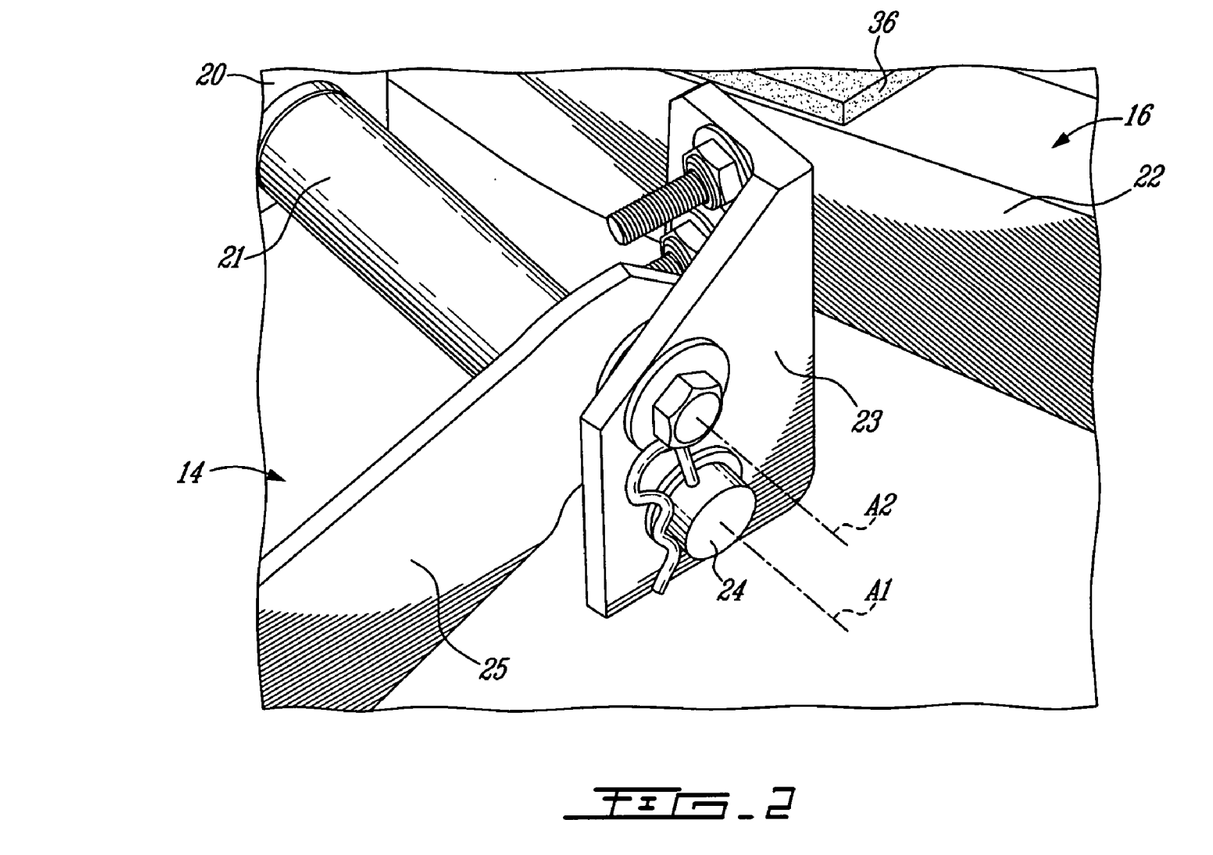
FIG. 2 is an enlarged perspective view of a pivoting mechanism between a support frame and a connector portion of the trailer of FIG. 1.

A pivoting mechanism is provided between the support frame 16 and the connector portion 14. Referring concurrently to FIGS. 1 and 2, the connector portion 14 has a longitudinal beam member 20 (FIG. 1), having adjacent to the second end 14B a transversely positioned shaft 21. The shaft 21 is part of the pivoting mechanism. The support frame 16 has a transverse beam member 22. The transverse beam member 22 is centrally bent, so as to form a V-shaped concavity.

The pivoting mechanism also has a pair of brackets 23, which are provided on the transverse beam member 22, and are positioned so as to be opposite the ends of the shaft 21, to which they are both pivotally joined by connection pins 24.

Figure 4:
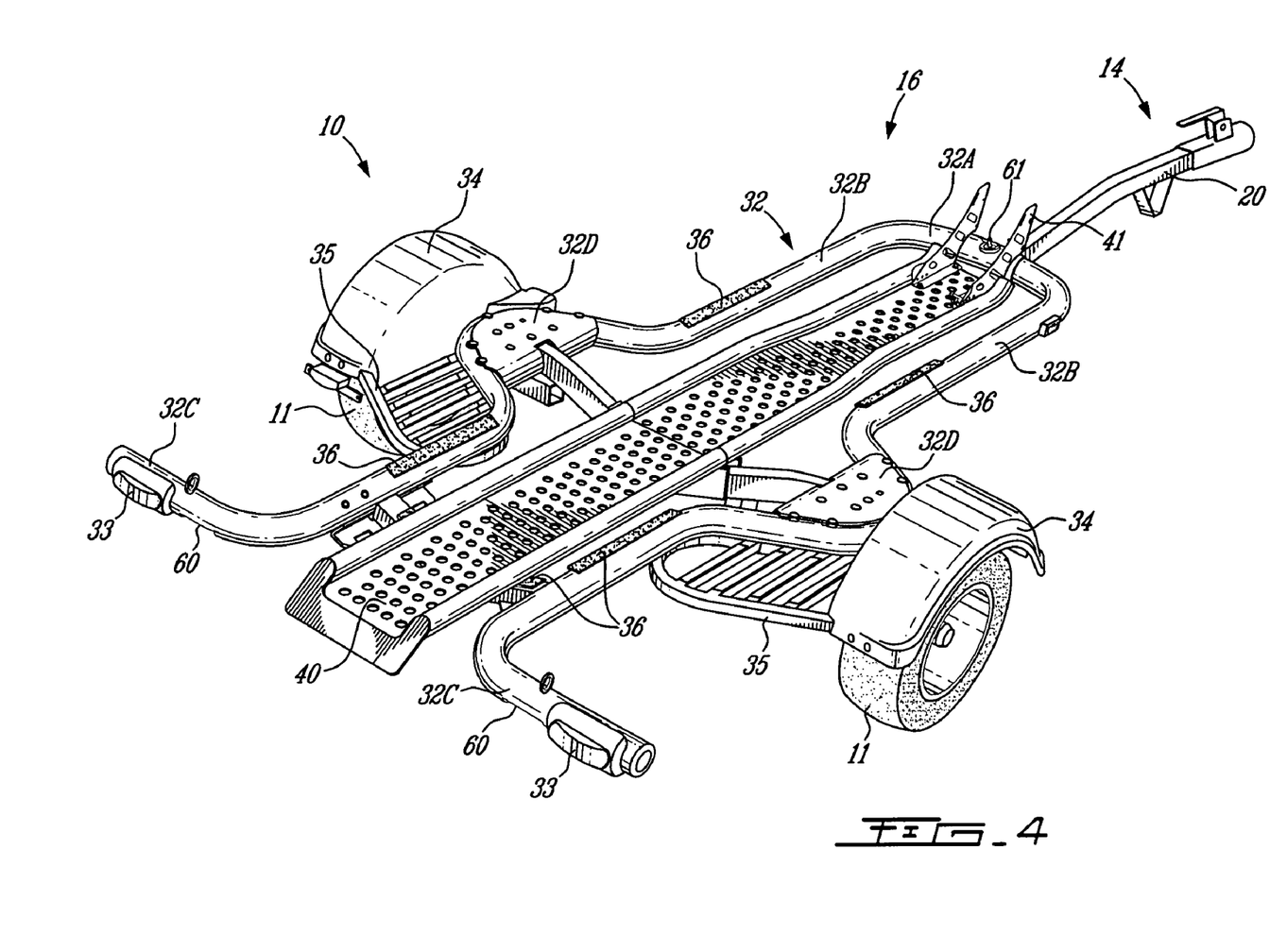
FIG. 4 is a rear perspective view of the trailer of FIG. 1, in a motorcycle-carrying configuration, with the support frame in a towing position.
Figure 5:
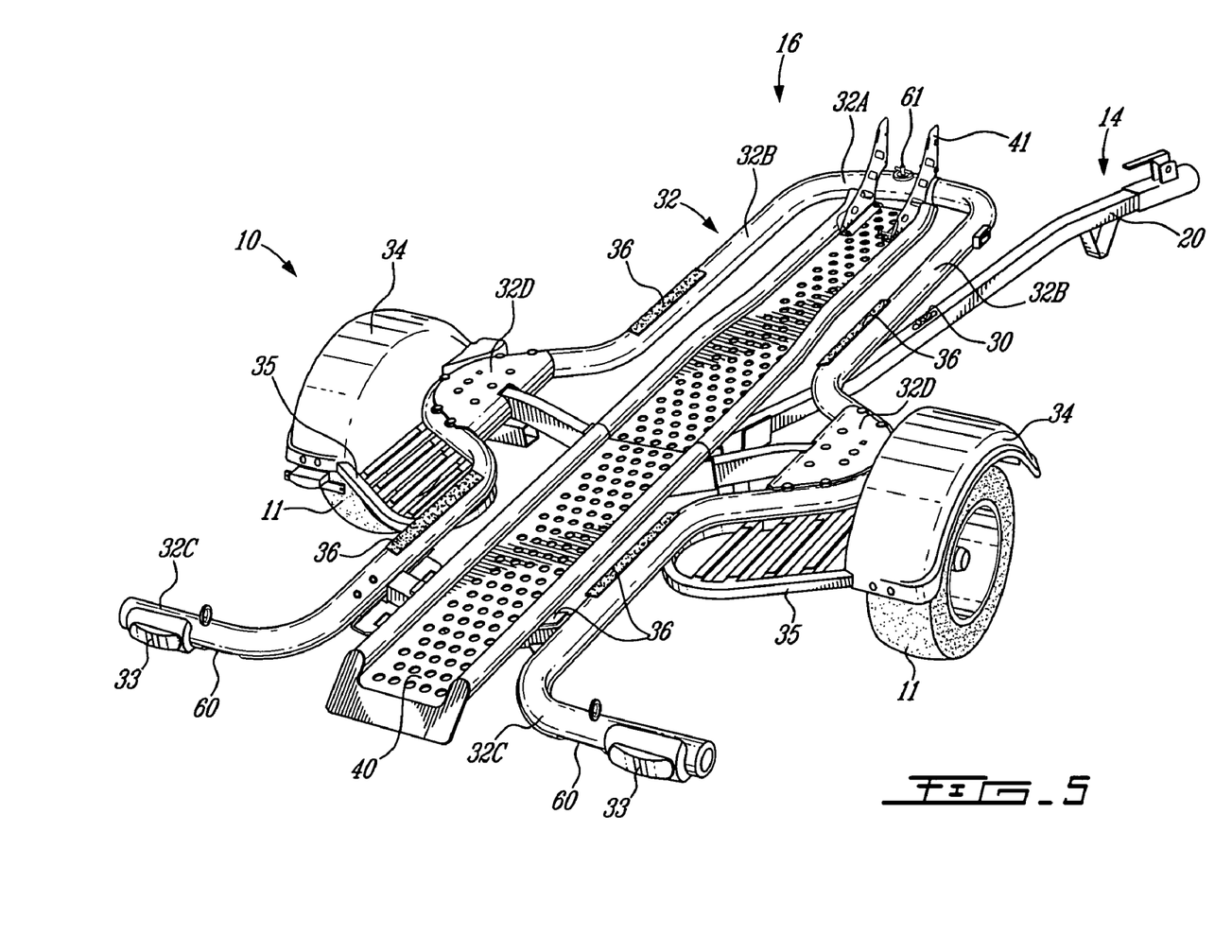
FIG. 5 is a rear perspective view of the trailer of FIG. 1, in a motorcycle-carrying configuration, with the support frame in a loading/unloading position.

Accordingly, by the pivot relation between the shaft 21 and the bracket 23, the support frame 16 is pivotable about axis A1 (FIG. 2), with respect to the connector portion 14. As shown in FIGS. 4 and 5, the support frame 16 is pivotable from a towing position (FIG. 4), to a loading/unloading position, in which a rear end of the support frame 16 is angled with the loading/unloading end being adjacent to the ground such that a vehicle may be driven onto the support frame 16.

However, it is desired to restrict free pivoting motion between the support frame 16 and the connector portion 14. More specifically, considering that a vehicle will be mounted onto the support frame 16 which will pivot from the loading/unloading position (FIG. 5) to the towing position (FIG. 4), it is considered to bias the support frame 16 to the loading/unloading position so as to prevent the impact of a sudden motion of the support frame 16 to the towing position.

Therefore, referring concurrently to FIGS. 1 and 2, a pair of springs 25 (i.e., plate springs) are provided, and are connected at front ends to the longitudinal beam member 20. As shown in FIG. 2, the springs 25 (one shown) are pivotally connected at a second end to the brackets 23 (again, one shown), about pivot axis A2. As the axes A1 and A2 are not collinear, the pivoting of the support frame 16 from the loading/unloading position (FIG. 5) to the towing position (FIG. 4) will be against the biasing action of the springs 25. Although a pair of plate springs 25 are described, other spring configurations are contemplated.

Figure 3A:
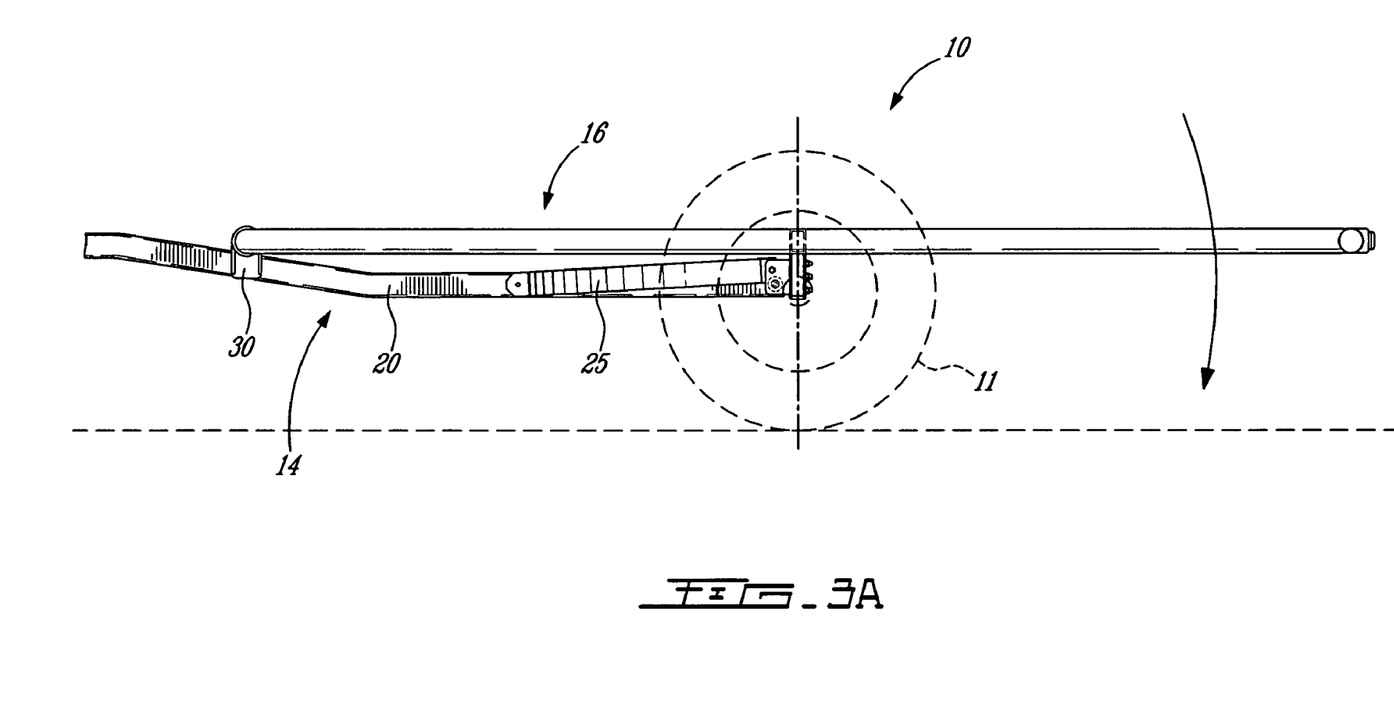
FIG. 3A is a schematic side view of the trailer of FIG. 1, with the support frame in a towing position.
Figure 3B:
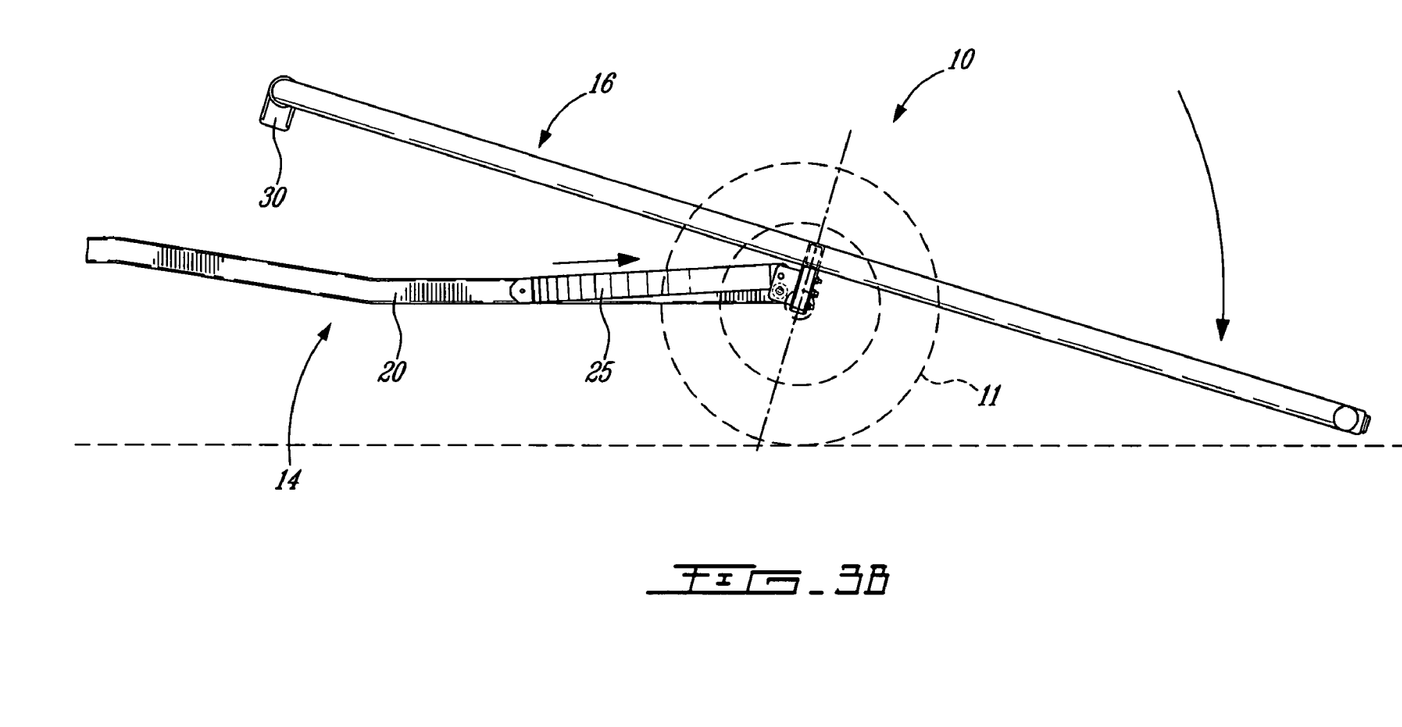
FIG. 3B is a schematic side view of the trailer of FIG. 1, with the support frame in a loading/unloading position.

Referring to FIGS. 3A and 3B, the two positions of the support frame 16 with respect to the connector portion 14 are illustrated. In FIG. 3A, the support frame 16 is generally horizontal, in the towing position. In FIG. 3B, the support frame 16 is in the loading/unloading position, with the loading/unloading end being brought toward the ground. In the embodiment illustrated in FIGS. 3A and 3B, the pivot axes A1 and A2 (FIG. 2) are in front of the wheel axles. Therefore, when a vehicle is loaded/unloaded, the wheel axles support a major portion of the weight, thereby reducing the forces exerted on the pivoting mechanism, and pivoting ends of the springs 25.

Figure 3C:
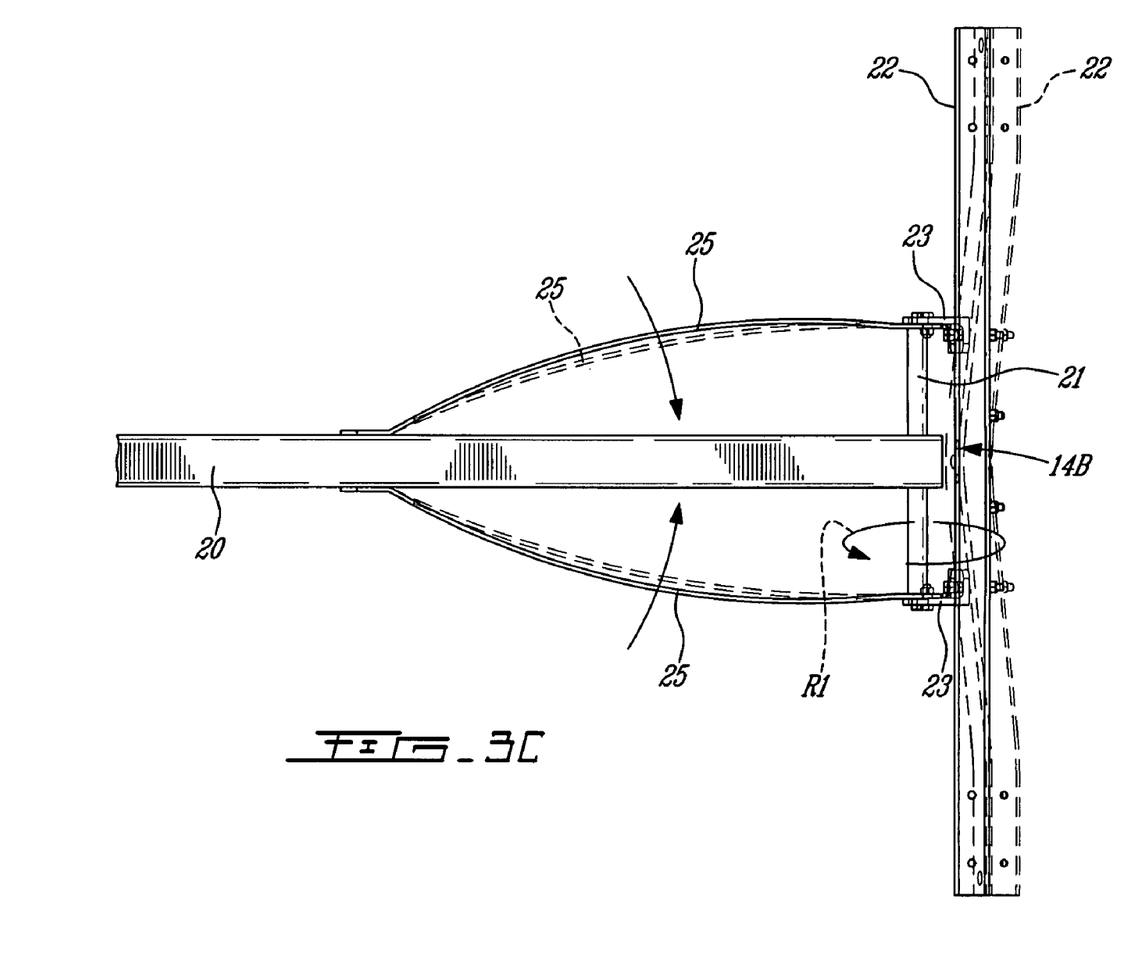
FIG. 3C is a top plan view of the pivoting mechanism of FIG. 2.

Referring to FIG. 3C, the reaction of the springs 25 is illustrated. The springs 25, in the position illustrated in FIG. 3C by full lines, bias the support frame 16 (as illustrated by the transverse member 22) to the loading/unlading position, illustrated in dashed lines in FIG. 3C. The rotation of the support frame 16 is about the shafts 21, as illustrated by R1.

It is pointed out that the materials used should be selected as a function of the forces involved. The bracket 23 must be selected so as to withstand the forces resulting from the displacement of the support frame 16 toward the towing position, and thus the biasing action of the springs 25 against this movement.

It is also desired to select the material and the sizes of the components in such a way that the deformation of the springs 25 is elastic, within the range of movements of the support frame 16 with respect to the connector portion 14.

Referring to FIGS. 4 and 5, a clamping device 30 is provided on a front end of the support frame 16, so as to releasably clamp the support frame 16 to the connector portion 14, in the towing position illustrated in FIG. 5.

Figure 6:
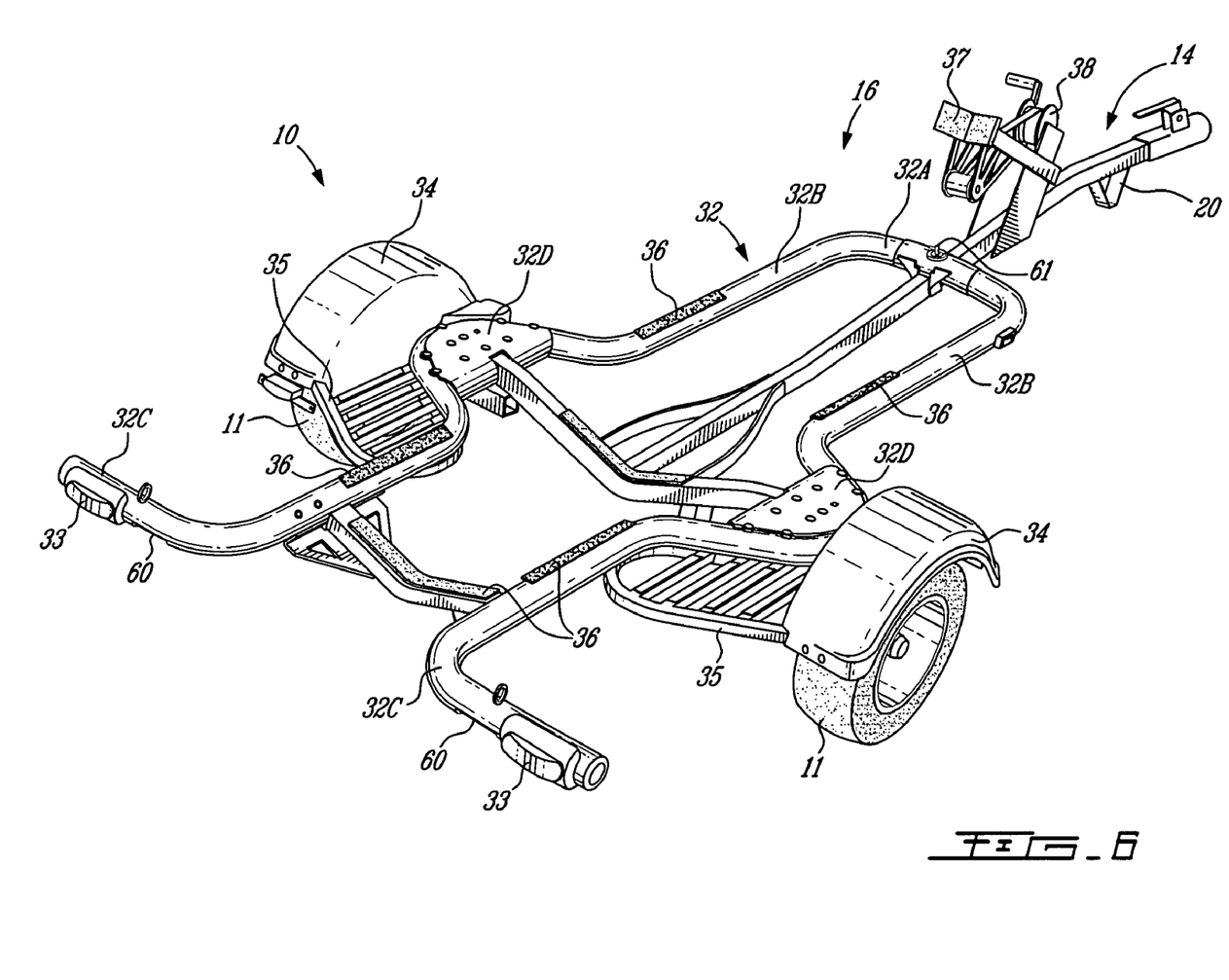
FIG. 6 is a rear perspective view of the trailer of FIG. 1, in the watercraft-carrying configuration.

Referring to FIG. 6, the support structure 16 is configured to support various types of small vehicles. The support structure 16 is generally symmetrical about a longitudinal axis of the trailer 10. In addition to the transverse beam member 22, another transverse beam member 31 is provided toward a rear end of the trailer 10.

A main pipe 32 forms a major part of the support frame 16, and has a transverse portion 32A toward a front end of the trailer 10. The transverse portion 32A supports the clamping device 30. Longitudinal portions 32B of the main pipe 32 project rearwardly from the transverse portion 32A. The longitudinal portions 32B are interconnected by the transverse beam members 22 and 31. Outward portions 32C of the main pipe 32 project laterally. The outward portions 32C support the tail lights 33 of the trailer 10.

The support frame 16 is also strengthened so as to support the axles of the wheels 11. More specifically, the main pipe 32 has a support portion 32D in the longitudinal portions 32B. The axles are connected to the support portions 32D, as are fenders 34. Side steps 35 are also connected to the support portions 32D. The user of the trailer 10 can use the side steps 35 as well as the support portions 32D, to climb onto the trailer 10, for instance to strap a vehicle onto the trailer 10.

The trailer 10, as illustrated in FIG. 6, is configured for watercrafts, such as personal watercrafts. More specifically, the V-shaped concavities in the transverse beam members 22 and 31 are particularly well suited to receive a hull of a watercraft. Resilient padding 36 is strategically positioned on the main pipe 32 and in the V-shaped concavities of the transverse beam members 22 and 31, so as not to damage the hull of the watercraft.

A bow abutment 37 is preferably provided on the connector portion 14, to form a stop that will prevent forward movement of the watercraft with respect to the trailer 10. A winch 38 is also optionally provided on the connector portion 14 of the trailer 10.

Additional support components may be mounted onto the support frame 16, so as to adapt the trailer 10 for other types of small vehicles.

Referring to FIGS. 4 and 5, a motorcycle ramp 40 is secured to the support frame 16. The motorcycle ramp 40 is centrally positioned in the support frame 16, by being supported by the transverse beam members 22 and 31. In the embodiment illustrated in FIGS. 4, 5 and 9, the ramp 40 has a stand device 41 at the front end of the trailer 10.

It is pointed out that the motorcycle ramp 40 and stand device 41 are preferably provided as modular parts, that can be mounted onto the trailer 10 of FIG. 6. With modular parts, the same trailer 10 may have different uses.

Figure 7:
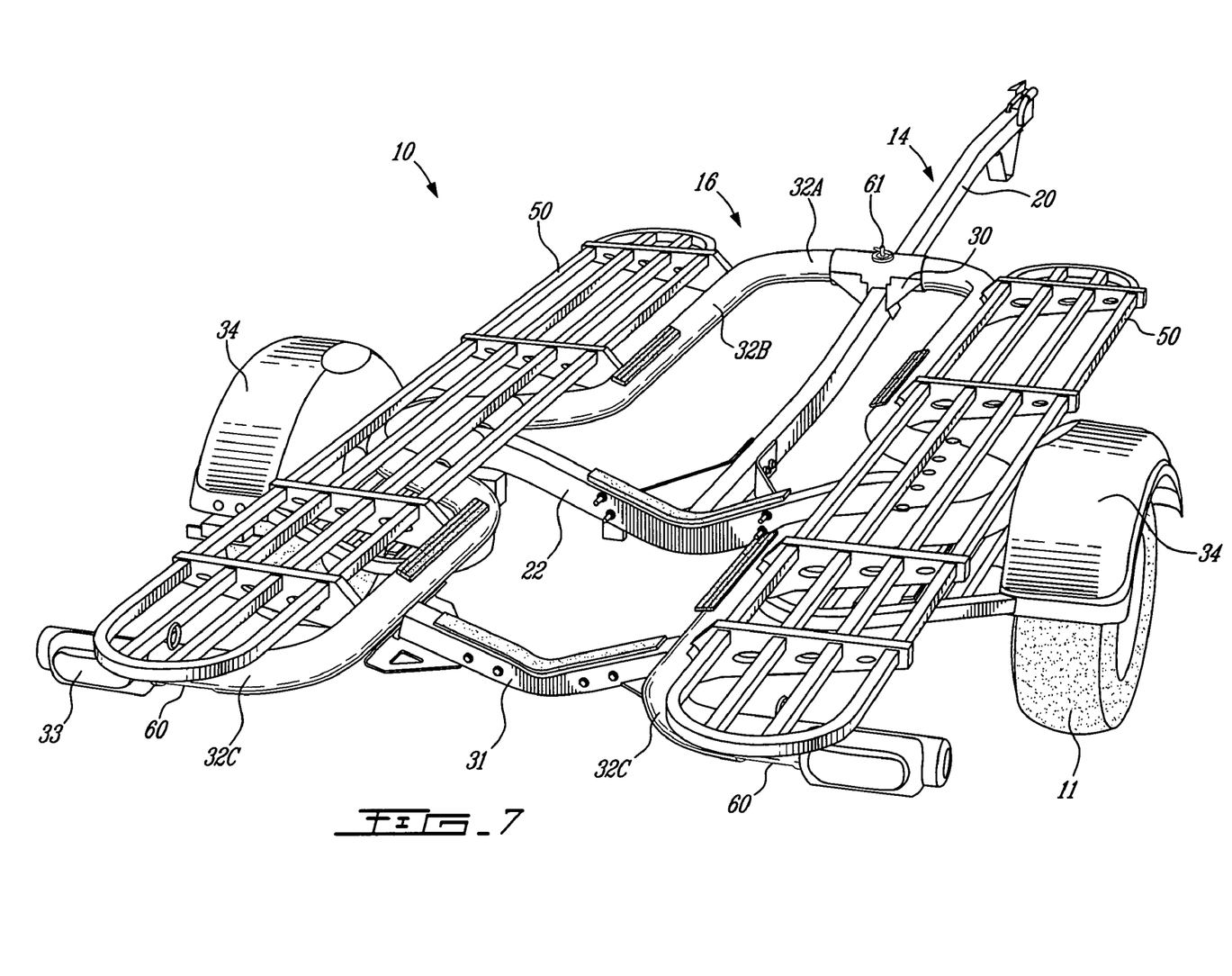
FIG. 7 is a rear perspective view of the trailer of FIG. 1, in a ATV-carrying configuration.

Referring to FIG. 7, the trailer 10 has a pair of ATV ramps 50. The ramps 50 are positioned along the longitudinal portions 32B of the main pipe 32, adjacent to the wheels 11. Once more, the ramps 50 are preferably provided as modular parts, that can be mounted onto the trailer 10 of FIG. 6.

In order to facilitate the release of a watercraft on water, the support surface 16 is equipped with a floating system. The buoyancy forces of the floating system are essentially provided by the main pipe 32, which is hollow, and by the wheels 11. As shown in FIG. 6, openings 60 are provided in the outward portions 32C of the main pipe 32, and face toward the ground. A valve 61 is provided in the transverse portion 32A of the main pipe 32.

When it is required to have the trailer 10 float, the valve 61 is closed, as well as any other opening in the main pipe 32, aside from the openings 60. Alternatively, the valve 61 is kept open so as not to have the trailer 10 float when immersed. It is pointed out that additional floaters may be required to ensure that the trailer 10 floats, especially when heavier loads are carried by the trailer.

Figure 8:
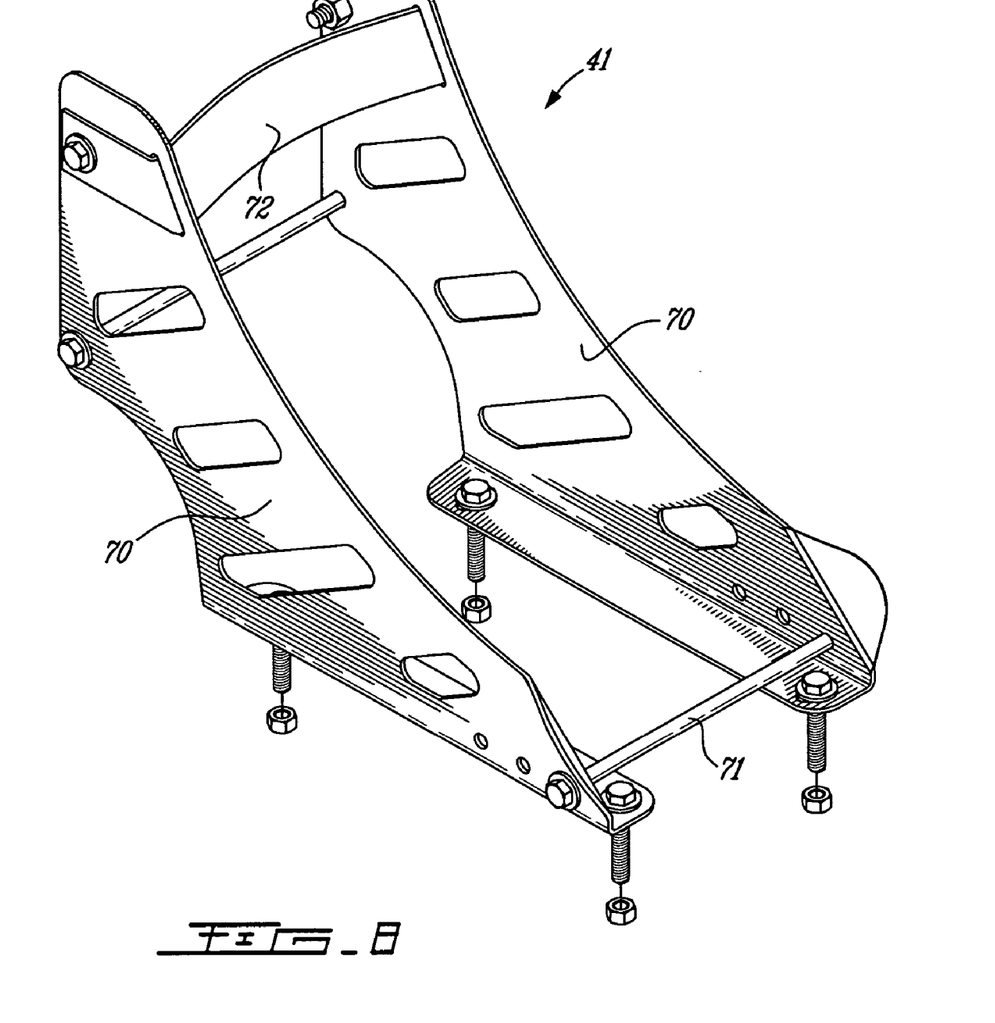
FIG. 8 is a perspective view of a stand device used on the trailer in the motorcycle-carrying configuration of FIG. 4.

Referring concurrently to FIGS. 4, 5 and 8, the stand device 41 is positioned at a front end of the ramp 40. The stand device 41 is used to secure the front wheel of a motorcycle in the towing position on the trailer 10. The stand device 41 has a pair of plates 70. The plates 70 are sufficiently spaced apart such that the front wheel of a motorcycle fits therebetween. A pin 71 is transversely positioned between the plates 70. A strap 72 also extends between the plates 70.

When a wheel is received in the stand device 41, the wheel abuts against the strap 72, and is maintained thereagainst by the pin 71. As a result, the strap 72 pulls the plates 70 toward one another, thereby exerting pressure against the walls of the wheel of the motorcycle.

Figure 9:
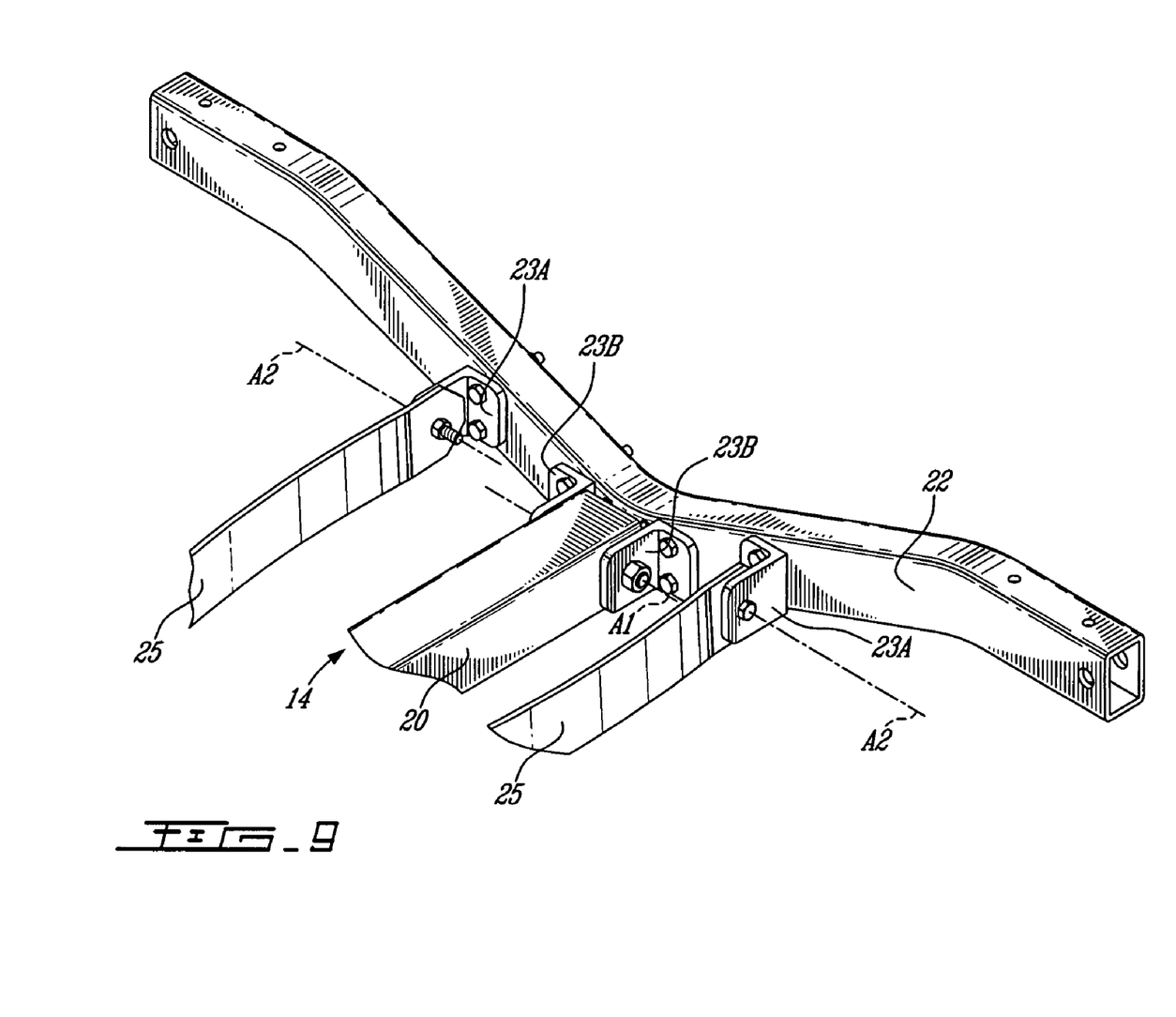
FIG. 9 is a perspective view of a pivoting mechanism between the support frame and the connector portion of the trailer of FIG. 1, in accordance with another embodiment.

Referring to FIG. 9, an alternative embodiment of the pivoting mechanism is illustrated, in which pairs of brackets 23A and 23B are provided instead of a single pair of brackets 23 (FIG. 2). The brackets 23B relate the longitudinal beam member 20 of the connector portion 14 to the transverse beam member 22 of the support frame 16, to allow pivoting about axis A1. Brackets 23A relate the springs 25 to the transverse beam member 22, to bias the support frame 16 to the loading/unloading position, by having the axes A2 with respect to the axis A1.

Figure 10:
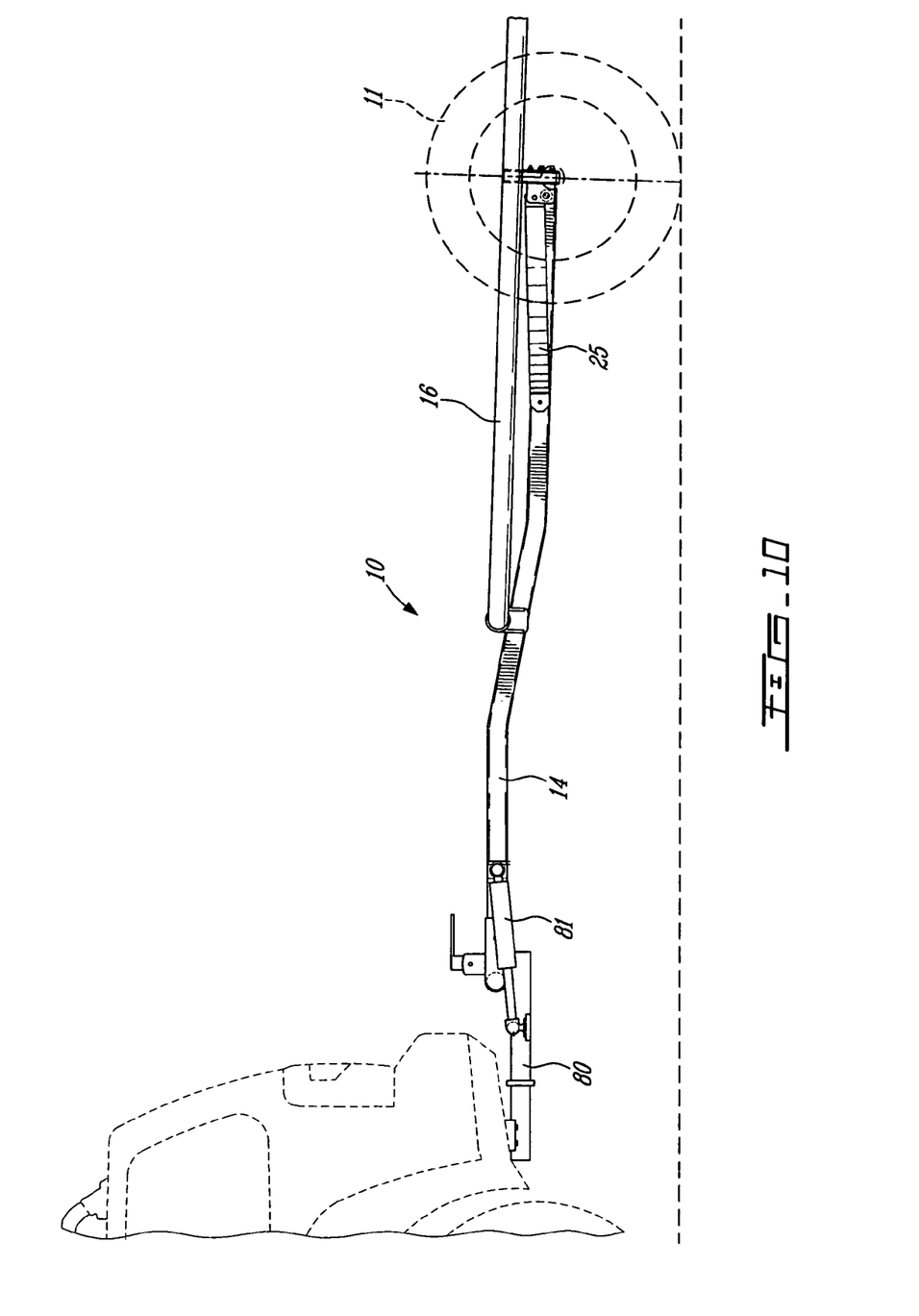
FIG. 10 is a schematic side view of the trailer of FIG. 1, in the watercraft-carrying configuration, as connected to a towing vehicle.

As shown in FIG. 10, a stabilizer device 81 (e.g., a cylinder or like damper) is provided between the connector portion 14 and the hitch 81 of the towing vehicle. The stabilizer device 81 is especially useful when the trailer 10 floats, to reduce the effect of waves or wind. The stabilizer device 81 is actuatable by way of a clutch system (pneumatic, mechanical, electromagnetic or the like.

The invention claimed is:

1. A trailer of the type being connectable to a towing vehicle so as to tow a small vehicle, comprising:
   wheels;
   a structure supported by the wheels, the structure having:
      a connector portion, adapted to be connected to the towing vehicle;
      a support frame having a support configuration with a loading/unloading end to support the small vehicle;
      a pivoting mechanism connecting the support frame to the connector portion in such a way that the support frame is pivotable about a first axis between a towing position in which the support frame supports the small vehicle for towing and a loading/unloading position in which the support frame is inclined with the loading/unloading end being adjacent to the ground;
      at least one plate spring positioned between the support frame and the connector portion to bias the support frame to the loading/unloading position, the at least one plate spring is pivotally connected at a first end to the connector portion, and pivotally connected at a second end to the support frame about a second axis offset and adjacent to said first axis of the pivoting mechanism; and
      a locking mechanism to lock the support frame to the connector portion in the towing position of the support frame.

2. The trailer according to claim 1, comprising two of the plate springs, the pivot axes at both ends of the two plate springs being collinear.

3. The trailer according to claim 1, wherein said first axis of the pivoting mechanism is positioned forward of an axle axis of the wheels.

4. The trailer according to claim 1, wherein the support configuration of the support frame has a frame having a pair of parallel longitudinal members separated by V-shaped transverse members so as to support a watercraft.

5. The trailer according to claim 4, wherein the support frame receives a support on the transverse members for two-wheel small vehicles.

6. The trailer according to claim 4, wherein the support frame receives supports on the longitudinal members for four-wheel small vehicles.

7. The trailer according to claim 1, wherein the support configuration has a stand device, the stand device having a pair of plates spaced apart to receive a wheel of the small vehicle therebetween, a strap being positioned between the pair of plates and in alignment with the plates so as to automatically abut the wheel entering the stand device such that a pressure against the strap brings the plates laterally against the wheel.

8. The trailer according to claim 4, wherein the longitudinal members include at least one longitudinal pipe, the longitudinal pipe being sealable to form a floating member.

9. The trailer according to claim 8, wherein the longitudinal pipe has an opening at a bottom rear end to allow air to enter the longitudinal pipe, and an opening at a front upper end provided with a valve of the longitudinal pipe to retain/release air from the longitudinal pipe.

* * * * *